(12) United States Patent
Chen et al.

(10) Patent No.: US 9,838,977 B2
(45) Date of Patent: Dec. 5, 2017

(54) METHOD, APPARATUS AND SYSTEM FOR MANAGING TRANSMISSION OF NOTIFICATION MESSAGES

(71) Applicant: INDUSTRIAL TECHNOLOGY RESEARCH INSTITUTE, Hsinchu (TW)

(72) Inventors: Yung-Han Chen, Hsinchu (TW); Fang-Ching Ren, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 104 days.

(21) Appl. No.: 15/130,965

(22) Filed: Apr. 16, 2016

(65) Prior Publication Data

US 2017/0257831 A1 Sep. 7, 2017

(30) Foreign Application Priority Data

Mar. 7, 2016 (TW) .............................. 105106914 A

(51) Int. Cl.
*H04W 4/00* (2009.01)
*H04W 52/24* (2009.01)
*H04B 17/318* (2015.01)
*H04W 4/06* (2009.01)
*H04W 84/18* (2009.01)

(52) U.S. Cl.
CPC ........ *H04W 52/245* (2013.01); *H04B 17/318* (2015.01); *H04W 4/06* (2013.01); *H04W 84/18* (2013.01)

(58) Field of Classification Search
None
See application file for complete search history.

(56) References Cited

U.S. PATENT DOCUMENTS

| 8,295,874 | B2 | 10/2012 | Harris et al. |
| 8,761,060 | B2 | 6/2014 | Patel et al. |

(Continued)

FOREIGN PATENT DOCUMENTS

| CN | 102413549 A | 4/2012 |
| TV | 201134240 A | 10/2011 |
| WO | WO-2015102635 A1 | 7/2015 |

OTHER PUBLICATIONS

Farhad Meshkati et al., "Mobility and Capacity Offload for 3G UMTS Femtocells", IEEE Global Telecommunications Conference (GLOBECOM) 2009 proceedings, Nov. 30, 2009-Dec. 4, 2009, pp. 1-7.

(Continued)

*Primary Examiner* — Anh-Vu Ly
(74) *Attorney, Agent, or Firm* — Rabin & Berdo, P.C.

(57) ABSTRACT

A communication method, an electronic device and a system for managing transmission of notification messages are provided. The method recognizes a transmission power of a base station is to be increased or decreased according to information of the base station. If the transmission power of the base station is to be increased, a first notification procedure is triggered to have one or more vicinity base stations of the base station transmitting a first message. And if the transmission power of the base station is to be decreased, a second notification procedure is triggered to have the base station transmitting a second message.

24 Claims, 5 Drawing Sheets

(56) References Cited

U.S. PATENT DOCUMENTS

| | | | |
|---|---|---|---|
| 8,897,815 B2 | 11/2014 | Chuang | |
| 9,055,541 B2 | 6/2015 | Patel et al. | |
| 9,166,875 B2* | 10/2015 | Mishra | H04L 41/069 370/389 |
| 9,716,559 B2* | 7/2017 | Chou | H04B 17/318 370/389 |
| 2007/0270151 A1 | 11/2007 | Claussen et al. | |
| 2010/0317394 A1 | 12/2010 | Harris et al. | |
| 2011/0116480 A1* | 5/2011 | Li | H04W 28/04 370/332 |
| 2012/0106370 A1* | 5/2012 | Radulescu | H04W 36/0083 370/252 |
| 2012/0127876 A1 | 5/2012 | Hunukumbure et al. | |
| 2013/0045735 A1 | 2/2013 | Kim et al. | |
| 2013/0196650 A1 | 8/2013 | Futaki | |
| 2013/0331114 A1* | 12/2013 | Gormley | H04W 72/082 455/452.1 |
| 2014/0286219 A1* | 9/2014 | Siomina | H04J 11/0023 370/311 |
| 2014/0315593 A1* | 10/2014 | Vrzic | H04W 52/38 455/522 |
| 2015/0031308 A1 | 1/2015 | Schmidt et al. | |
| 2015/0043386 A1* | 2/2015 | Racz | H04L 41/044 370/255 |
| 2015/0072690 A1 | 3/2015 | Kim et al. | |
| 2015/0173086 A1* | 6/2015 | Karaman | H04W 8/005 370/254 |
| 2015/0318946 A1* | 11/2015 | Abdelmonem | H04L 5/006 370/252 |

OTHER PUBLICATIONS

Jessica Moysen et al., "Self Coordination among SON functions in LTE Heterogeneous Networks", 2015 IEEE 81st Vehicular Technology Conference (VTC Spring), May 11-14, 2015, pp. 1-6.

Jietao Zhang et al., "A Hybrid Framework for Capacity and Coverage Optimization in Self-Organizing LTE Networks", 2013 IEEE 24th International Symposium on Personal, Indoor and Mobile Radio Communications: Mobile and Wireless Networks, Sep. 8-11, 2013, pp. 2919-2923.

Mugen Peng et al., "Self-Configuration and Self-Optimization in LTE-Advanced Heterogeneous Networks", IEEE Communications Magazine, May 2013, pp. 36-45.

Sascha Berger et al., "Comparing Online and Offline SON Solutions for Concurrent Capacity and Coverage Optimization", 2014 IEEE 80th Vehicular Technology Conference (VTC2014-Fall), Sep. 14-17, 2014, pp. 1-6.

Andrea Garavaglia et al., "Inter-System Cell Reselection Parameter Optimization in UMTS", 2005 IEEE 16th International Symposium on Personal, Indoor and Mobile Radio Communications, Sep. 11-14, 2005, vol. 3, pp. 1636-1640.

* cited by examiner

METHOD, APPARATUS AND SYSTEM FOR MANAGING TRANSMISSION OF NOTIFICATION MESSAGES

CROSS-REFERENCE TO RELATED APPLICATION

This application claims priority benefit of Taiwan application serial no. 105106914, filed on Mar. 7, 2016, the entirety of which is incorporated herein by reference.

TECHNICAL FIELD

The technical field relates to a method, an apparatus and a system for managing transmission of notification messages.

BACKGROUND

A self-organizing network (SON) is a communication network that may perform parameter(s) configuration, network optimization, performance measurement, troubleshooting etc. via automation mechanism, therefore, it may reduce the network deployment and configuration cost of operators, it may shorten the network optimization time, improve the operational efficiency and maintain the communication quality effectively. To fulfill the radio signal coverage rate, the interference control, the capacity, the load adjustment and so on, the radio transmission power of the base station (BS) in the SON may be adjusted adaptively to enhance the energy efficiency and/or improve the signal quality. The network architecture of SON may be centralized, distributed or hybrid. In a centralized SON, a SON controller or server centralizes the control of the BSs within the SON. A distributed SON allows each BS to control the SON operations by itself. A hybrid SON mixes architectures of the centralized SON and the distributed SON.

Nevertheless, for part of the user equipment(s) operating in an idle-mode (hereafter called "idle UE") that already registered and camped on a BS, the mobile network system and the BS is unable to obtain the exact location of the aforementioned idle UE. The location of an idle UE is explored only when the idle UE is requesting for a connection service or is been tracked (for instance, is responding a paging message). Therefore, when the transmission power of a BS in a SON is decreased, the idle UE located at the boundary of the signal coverage of the BS may lose the BS on which the idle UE originally camped. If the idle UE fails to discover a connectable BS via a BS reselection procedure, the idle UE will fail to connect any network thereafter. In other words, the location of the idle UE is becoming a coverage hole. Or, if the transmission power of a BS is increased so that the coverage covers an idle UE camping on a vicinity BS, the idle UE may suffer a larger interference when it would like to regain a connection.

Therefore, it is becoming a design consideration on how to avoid a negative influence to an idle UE due to the adjustment of the transmission power or the signal coverage of a BS in a SON.

SUMMARY

Exemplary embodiments in accordance with the application provide a method, an apparatus and a system for managing transmission of notification messages.

An exemplary embodiment provides a method for managing transmission of notification messages. The method recognizes a transmission power of a base station is to be increased or decreased according to a base station information. If the transmission power of the base station is to be increased, the method triggers a first notification procedure to have one or more vicinity base stations of the base station transmitting a first message. And if the transmission power of the base station is to be decreased, the method triggers a second notification procedure to have the base station transmitting a second message.

Another exemplary embodiment provides an electronic device for managing transmission of notification messages. The electronic device includes a transceiver for receiving information of a base station, and a processing circuit is operatively coupled to the transceiver. The processing circuit is configured to recognize a transmission power of a base station is to be increased or decreased according to a base station information; trigger a first notification procedure to have one or more vicinity base stations of the base station transmitting a first message, if the transmission power of the base station is to be increased; and trigger a second notification procedure to have the base station transmitting a second message, if the transmission power of the base station is to be decreased.

An exemplary embodiment provides an electronic system for managing transmission of notification messages. The electronic system includes a self-organizing network controller providing a base station information, and a base station selector coupled to the self-organizing network. The base station selector recognizes a base station is to be increased or decreased a transmission power according to the base station information. Wherein, the base station selector triggers a mobility management controller to perform a first notification procedure to have one or more vicinity base stations of the base station transmitting a first message, if the transmission power of the base station is to be increased. The base station selector triggers the mobility management controller to perform a second notification procedure to have the base station transmitting a second message, if the transmission power of the base station is to be decreased.

The foregoing will become better understood from a careful reading of a detailed description provided herein below with appropriate reference to the accompanying drawings.

DETAILED DESCRIPTION OF THE EXEMPLARY EMBODIMENTS

Figure 1:
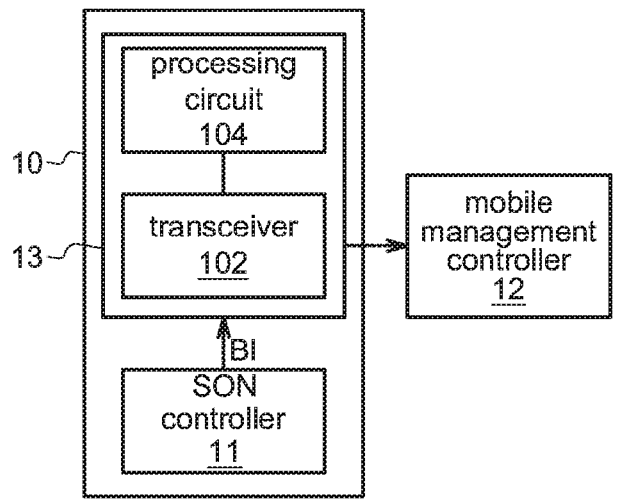
FIG. 1 shows a conceptual graph of a communication configuration for managing transmission of notification messages in accordance with an exemplary embodiment of the application.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The disclosure will demonstrate the exemplary embodiments of a method of managing transmission of notification message and the electronic device and the electronic system using the same, which may trigger a notification procedure of designated base station(s) before adjusting a transmission power of a base station. An idle user equipment (idle UE) may perform an indicating measurement according to the notification message received, and may selectively choose to feed back a measurement report as a reference for an adjustment of the transmission power of a base station.

FIG. 1 shows a conceptual graph of a communication configuration for managing transmission of notification messages in accordance with an exemplary embodiment of the application. The communication configuration includes an electronic system 10 and a mobility management controller 12. The electronic system 10 includes a self-organizing network (SON) controller 11 and a base station selector 13. The SON controller 11 and the base station selector 13 may be implemented in any electronic device with program and/or algorithm execution ability, such as a computer and/or a computational server. In an embodiment, the SON controller 11 and base station selector 13 may be implemented in different computational circuits or program modules, or be integrated in a circuit or a program module in another embodiment. The mobility management controller 12 may be, for example, a Mobility Management Entity (MME), a Small Cell Gateway, a Home eNB Gateway (HeGW), or the other mobility control unit of the mobile communications. The electronic system 10 may connect to the mobility management controller 12 by a wired or wireless manner in different embodiments. In an embodiment, the electronic system 10 may also be integrated together with the mobility management controller 12, such as be implemented at the same electronic computational device.

A SON controller 11 may adaptively adjust the transmission power of a base station based on the environmental condition or other predetermined conditions. For example, the SON controller 11 may list the base station identity (ID) of one or more base stations which the transmission power would be adjusted and a corresponding power adjustment setting thereof, to form as a base station information BI.

In an embodiment, the base station selector 13 includes a transceiver 102 and a processing circuit 104. The transceiver 102 may be, for example, a transceiver interface of wired or wireless signals. The processing circuit 104 may be, for example, a processor, a controller or an electronic device with computational ability. A transceiver 102 may receive base station information BI from a SON controller 11. The processing circuit 104 is operatively coupled to a transceiver 102 and may be configured to perform the communication method of managing transmission of notification messages described in an embodiment of the application.

Figure 2:
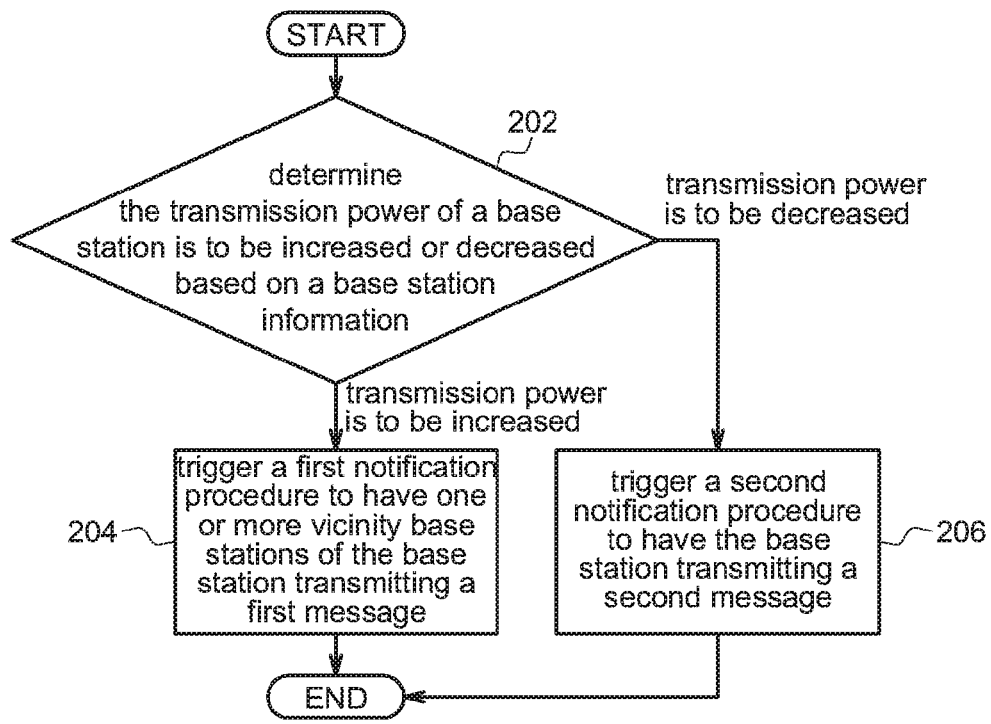
FIG. 2 shows an operating flow of managing transmission of notification messages method in accordance with an exemplary embodiment of the application.

FIG. 2 shows an operating flow of managing transmission notification messages method in accordance with an exemplary embodiment of the application. As shown in FIG. 2, a processing circuit 104 of a base station selector 13 is configured to recognize that the transmission power of a base station is to be increased or decreased based on a base station information BI (step 202). If the transmission power of the base station is to be increased, the processing circuit 104 will trigger a first notification procedure to have one or more vicinity base stations of the base station transmitting a first message (step 204). A vicinity base station is, for example, a base station having a signal coverage range neighboring to, adjacent to, or overlapping that of the base station which the transmission power is to be adjusted; or a base station having the largest signal coverage range overlapping that of the base station which the transmission power is to be adjusted. If the transmission power of the base station is to be decreased, the processing circuit 104 will trigger a second notification procedure to have the base station transmitting a second message (step 206).

If the transmission power of a base station is increased, the signal of the base station may interfere with one or more idle user equipments (idle UEs) of the one or more vicinity base stations. In such a scenario, one or more idle UEs camping on the vicinity base stations of the base station may be treated as object(s) that will be affected by the adjustment of the transmission power. In an embodiment, base station selector 13 will trigger mobility management controller 12 to instruct the one or more vicinity base stations of the base station transmitting a first message to notify the one or more idle UEs camping on the one or more vicinity base stations (referred to as first notification procedure). In an embodiment, the first message may have the one or more idle UEs camping on the one or more vicinity base stations measuring the signal interference of the base station. The one or more UEs may choose to feed back a first measurement report, if the measured signal interference satisfies a signal interference condition. SON controller 11 may determine the adjustment of the transmission power of the base station based on the first measurement report. The FIG. 3, FIG. 5 and FIG. 6 will describe further details with exemplary embodiments.

In another embodiment, if the transmission power of a base station is decreased, one or more idle UEs in the edge of the base station may be out of the signal coverage range of this originally camped base station, and may fail to proceed the re-connection later on. In such a scenario, one or more idle UEs camping on the base station may be treated as object(s) that will be affected by an adjustment of the transmission power. In an embodiment, base station selector 13 will trigger mobility management controller 12 to instruct the base station transmitting a second message to notify one or more idle UEs camping on the base station (referred to as second notification procedure). In an embodiment, the second message may have the one or more idle UEs camping on the base station measuring the signal strength of the base station. The one or more UEs will feed back selectively a second measurement report, if the measured signal strength satisfies a signal strength condition. SON controller 11 may determine an adjustment of the transmission power of the base station based on the second measurement report. The FIG. 4, FIG. 5 and FIG. 6 will describe further details with exemplary embodiments.

Through the aforementioned mechanism, a base station selector 13 may only list base station(s) which may be affected as an object to be notified, and have the mobility management controller 12 transmits a notification message to the base station(s) be listed as the notification object. The base station selector 13 may also setting the notification message type, such that an idle UE may perform a measurement be indicated and feed back a report (for instance, a first measurement report or a second measurement report) in response to different types of notification message (for instance, a first message or a second message). Therefore, the SON controller 11 may take as a reference for further adjusting of the base station transmission power. For only the base station(s) affected by an adjustment of the transmission power will transmit the notification message, such that the unnecessary notifications are diminished effectively and possible wasting of network resources is reduced. Also for the idle UE(s) that may be affected by the adjustment of the transmission power may perform indicated measurement and feed back report to a SON controller 11 in response to different types of notification message. The SON controller 11 may optimize the adjustment of the transmission power to more compliance with the network efficiency.

Figure 3:
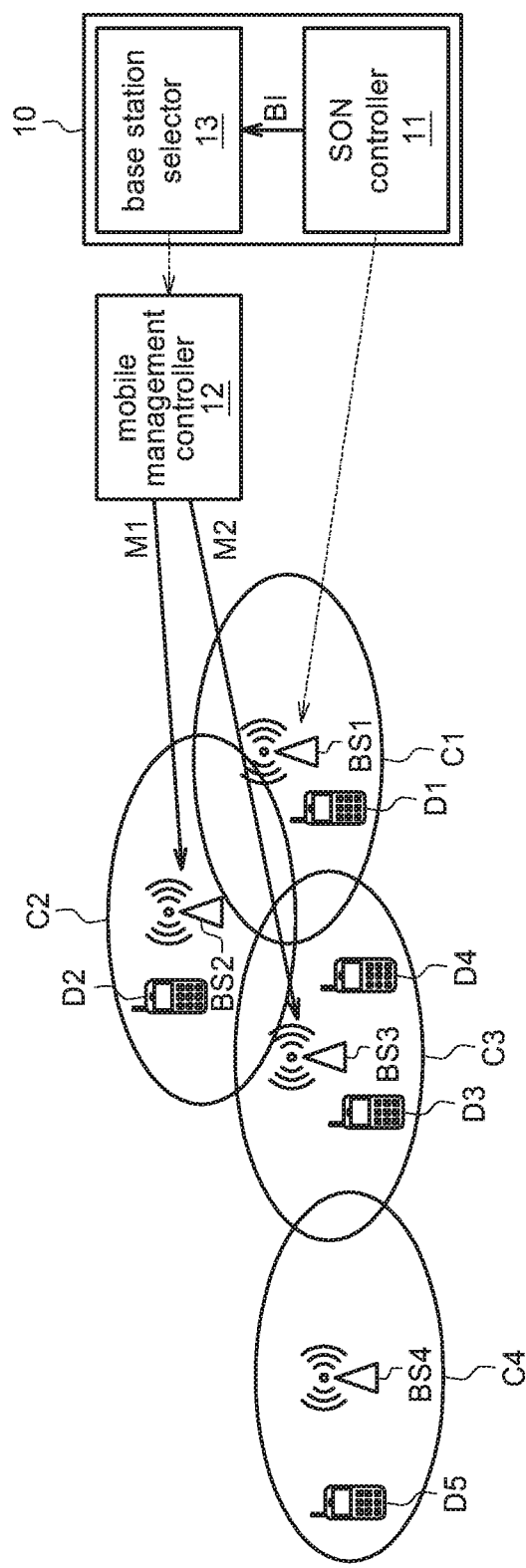
FIG. 3 shows a conceptual graph of the communication configuration of FIG. 1 performs a first notification procedure in accordance with an exemplary embodiment of the application.

In FIG. 3, a conceptual graph of the communication configuration of FIG. 1 performs a first notification procedure in accordance with an exemplary embodiment is shown. In this embodiment, four base stations BS1-BS4 form signal coverage ranges C1-C4 respectively. Wherein, a user equipment D1 camps on base station BS1, a user equipment D2 camps on base station BS2, user equipments D3 and D4 camp on base station BS3, and a user equipment D5 camps on base station BS4. The number of base stations, the number of UEs and the configuration shown in the figure are for illustration only, and the application may be embodied in various forms without being limited to this exemplary embodiment set forth herein.

As shown in the embodiment of FIG. 3, when a SON controller 11 decides to increase the transmission power of base station BS1, a base station selector 13 will trigger a first notification procedure based on a base station information BI provided by the SON controller 11. This causes a mobility management controller 12 sending an instruction which has the vicinity base stations BS2, BS3 of the base station BS1 transmitting a first message M1. At the time, if the UE D2-D4 camping on the base station BS2, BS3 is in an idle mode (that is, be the idle BS), these user equipments D2-D4 may be triggered by the first message M1 to measure a signal interference. Base on a predefined condition, the user equipments D2-D4 may selectively feed back a first measurement report as a reference for the SON controller 11 adjusting the transmission power of the base station BS1.

Figure 4:
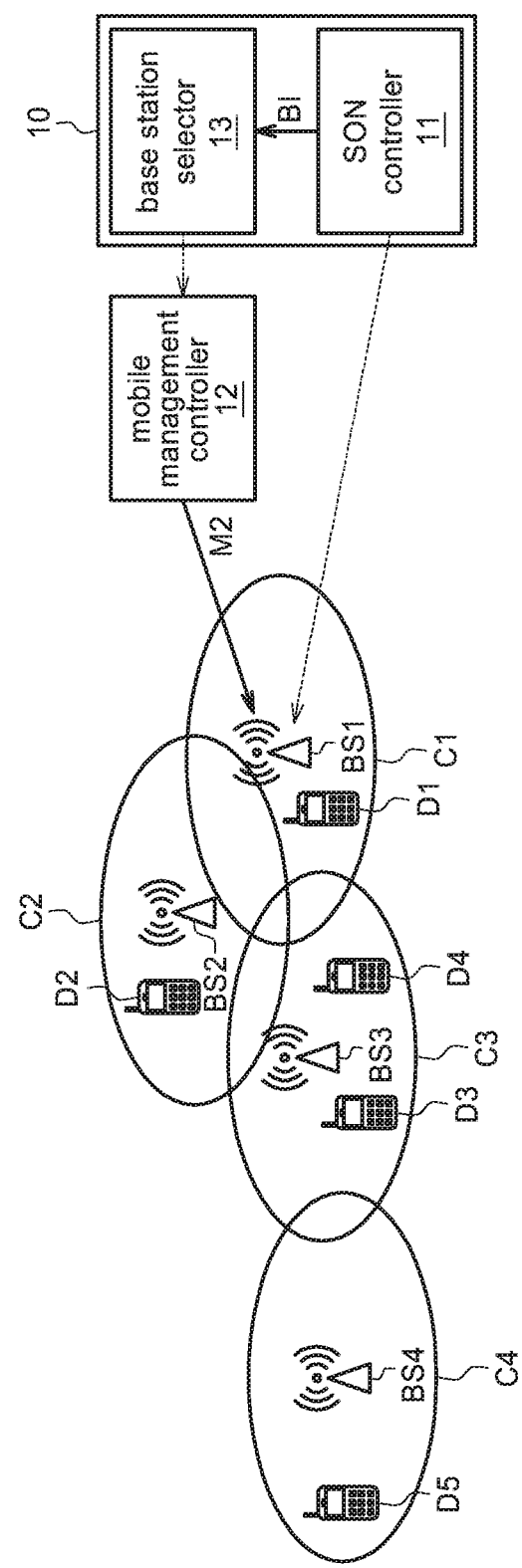
FIG. 4 shows a conceptual graph of the communication configuration of FIG. 1 performs a second notification procedure in accordance with an exemplary embodiment of the application.

FIG. 4 shows a conceptual graph of the communication configuration of FIG. 1 performs a second notification procedure in accordance with an exemplary embodiment of the application. In this exemplary embodiment, the SON controller is going to decrease the transmission power of the base station BS1.

According to the base station information BI provided by the SON controller 11, when the base station selector 13 knows that the SON controller 11 is going to decrease the transmission power of the base station BS1, the base station selector 13 will trigger a second notification procedure. This causes the mobility management controller 12 sending an instruction which has the base station BS1 transmitting a second message M2. At the time, if the UE D1 camping on the base station BS1 is in the idle mode, UE D1 may be triggered by the second message M2 to measure a signal strength. Based on a predefined condition, UE D1 may selectively feed back a second measurement report as a reference for the SON controller 11 adjusting the transmission power of the base station BS1.

Figure 5:
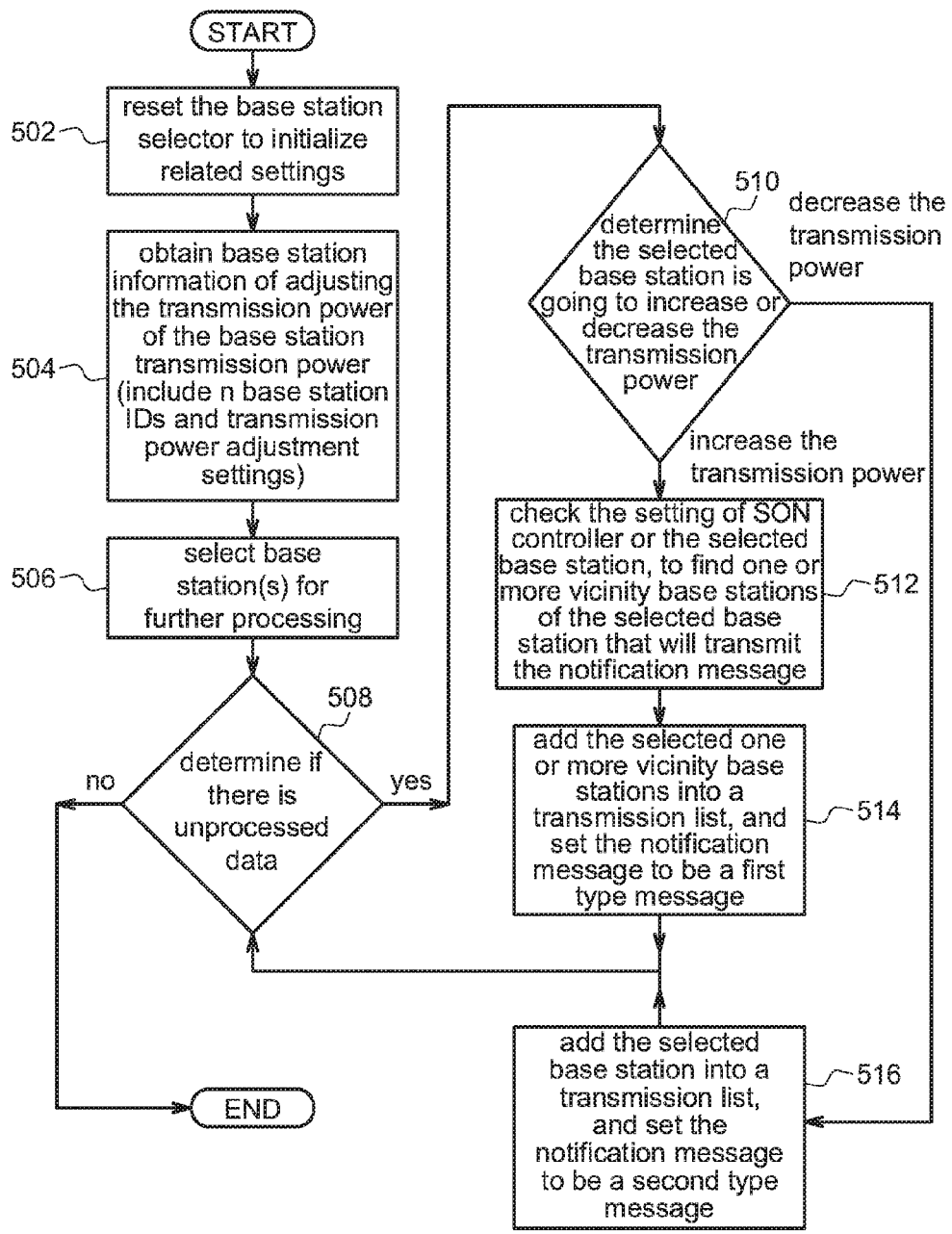
FIG. 5 shows an operating flow of a base station selector in accordance with an exemplary embodiment of the application.

As shown in FIG. 5, an operating flow of a base station selector 13 in accordance with an exemplary embodiment is provided. Also refer to the FIG. 1, the base station selector 13 includes a transceiver 102 and a processing circuit 104. The base station selector 13 is reset to initialize related settings (step 502 in FIG. 5). In step 504, base station selector 13 obtains base station information BI of adjusting the transmission power of the base station transmission power from the SON controller 11. The base station information BI, for example, may include n base station identities (IDs) and their corresponding transmission power adjustment settings, wherein n is a positive integer.

Base station selector 13 then selects base station(s) to be processed. In an embodiment, base station information BI may include, for example, a Look-Up Table (LUT) and the base station selector 13 may select base station(s) for further processing by looking up the LUT (step 506 in FIG. 5), or the base station selector 13 may select base station(s) for further processing according to a predefined sequence, for example, by the identity (ID) sequence.

In step 508, base station selector 13 determines if there is unprocessed data, namely, determines whether all the base stations having the transmission power to be adjusted have been processed or not. If there is unprocessed data, then the operating flow continues to process step 510, otherwise, the operating flow comes to the end.

Base station selector 13 recognizes the selected base station is going to increase or decrease the transmission power (step 510 in FIG. 5). If the selected base station is to increase the transmission power, the operating flow continues to process step 512. Otherwise, if the selected base station is to decrease the transmission power, then the operating flow continues to process step 516.

In step 512 of FIG. 5, base station selector 13 checks the setting of SON controller 11 or the selected base station, to find one or more vicinity base stations of the selected base station that will transmit the notification message.

In step 514, base station selector 13 (for instance, the processing circuit 104 is configured) adds the selected one or more vicinity base stations into a transmission list (skip the vicinity base station already listed in the transmission list), and sets the notification message to be a first type message to have mobility management controller 12 sending an instruction that has the base station(s) in the transmission list transmitting a first message. For example, if an i-th base station ID of n base station IDs in the base station information BI is corresponding to a transmission power increment setting, the base station selector 13 will find the one or more vicinity base station IDs and add the found vicinity base station ID into the transmission list. Wherein one or more base stations corresponding to the one or more vicinity base station IDs is one or more base stations in the vicinity corresponding to the i-th base station ID wherein n is a positive integer, and i is a positive integer between 1 and n. The operating flow continues to process step 508 until there is no unprocessed data.

Decreasing the transmission power of the selected base station will only affect the idle UE camping on the selected base station. Therefore, in step 516 of FIG. 5, base station selector 13 adds directly the selected base station into a transmission list (skip the selected base station already listed in the transmission list), and sets the notification message to be a second type message to have mobility management controller 12 sending an instruction to have the base station(s) in the transmission list transmitting a second message. For example, if an i-th base station ID of n base station IDs of the base station information BI is corresponding to a transmission power decrement setting, the base station selector 13 will add directly the i-th base station ID into the transmission list. The operating flow continues to process step 508 until there is no unprocessed data.

After finishing the transmission list, base station selector 13 will have mobility management controller 12 transmitting at least one notification message according to at least one base station ID recorded in the transmission list.

In the described mechanism, only the base station(s) affected by the adjustment of the transmission power will transmit the notification message. Therefore, the unnecessary notifications are diminished effectively and possible wasting of system resources is reduced.

In an embodiment, the idle UE(s) receiving the notification message (such as the first message or the second message) selectively feeds back its measurement report to reduce the resource occupancy caused by the report fed back. And in an embodiment, the first message and the second message are a first paging message and a second paging message, respectively, and each of the first message and the second message has a predetermined paging cause. The predefined paging cause may, for example, represent that only when an idle UE satisfying one or more predefined conditions needs to feed back the measurement report. The predefined condition may be one or more conditions constituted by some related index of signal quality. For example, the predefined condition may represent whether a signal interference is higher than a threshold or a signal strength is lower than a threshold or not.

Figure 6:
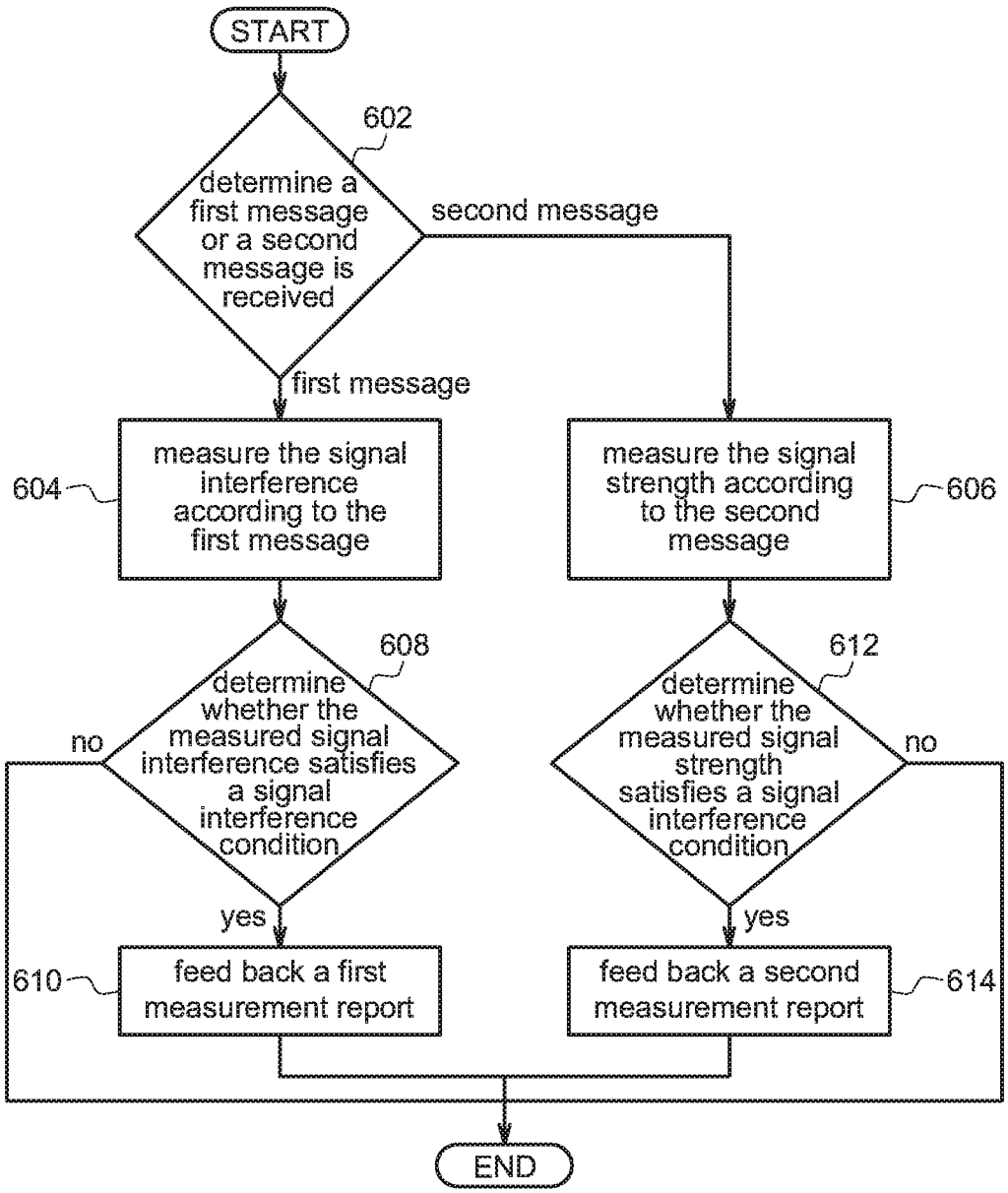
FIG. 6 shows an operating flow that a user equipment responses a notification message in accordance with an exemplary embodiment of the application.

FIG. 6 shows an operating flow that a user equipment responses a notification message in accordance with an exemplary embodiment of the application. As shown in FIG. 6, in step 602, a UE determines a first message or a second message is received. If the first message is received, the UE will measure the signal interference according to the first message (step 604 in FIG. 6). If the second message is received, the UE will measure the signal strength according to the second message (step 606 in FIG. 6).

In an embodiment, for example, the UE may determine whether the measured signal interference satisfies a signal interference condition or not (step 608 in FIG. 6). For example, the UE may detect if the signal strength of the base station causing the interference is higher than a predefined threshold, or detect if a total interference strength is higher than a predefined threshold, or detect if the received signal quality of the camped base station (for instance, the Signal to Interference Noise Ratio (SINR)) is lower than a predefined threshold.

In an embodiment, if the measured signal interference satisfies a signal interference condition, the UE will feed back a first measurement report (step 610 in FIG. 6). Thus the SON controller 11 may adjust the transmission power of the base station according to the first measurement report. The first measurement report may be represented, for example, by a predefined preamble code or a measurement result. The contents of the first measurement report may simply indicate whether the signal interference exceeds a tolerable value or not. In dependence with the granularity, the first measurement report may also indicate a preferable and/or acceptable transmission power strength value and/or range.

Otherwise, if the measured signal interference does not satisfy the signal interference condition, in an embodiment, the UE may choose not to response the first message and end the operating flow. In an embodiment, if there is no any UE that response the first message, the SON controller 11 may increase the transmission power of the base station with a predefined transmission power adjustment value. While if there is at least one UE that responses the first message, then the adjustment value may be recalculated in accordance with the contents of the response. For example, the adjustment value may be recalculated according to the status and/or the value of the interference strength fed back by the responding UE. For instance, the adjustment value may be set to be the smallest one of tolerable values.

In an embodiment, the UE may determine the measured signal strength satisfies a signal interference condition or not (step 612 in FIG. 6). For example, the UE may detect if a Received Signal Strength Indication (RSSI) is lower than a predefined threshold. If yes, in an embodiment, the UE will feed back a second measurement report (step 614 in FIG. 6). If no, the UE may choose not to response the first message and end the operating flow. In an embodiment, if there is no any UE that response the second message, the SON controller 11 may decrease the transmission power of the base station with a predefined transmission power adjustment value. While if there is at least one UE that responses the first message, then the adjustment value may be recalculated in accordance with the contents of the response. For example, the adjustment value may be recalculated according to the status and/or the value of the signal strength or quality fed back by the responding UE. The second measurement report may be represented, for example, by a predefined preamble code or a measurement result. The contents of the second measurement report may simply indicate whether the signal interference is below a tolerable value or not. In dependence with the granularity, the second measurement report may also indicate a preferable and/or acceptable transmission power strength value and/or range.

In an embodiment, a base station may choose to notify the idle UE camping on the base station of the message of adjusting the transmission power, for example, the message of a system information broadcasting. The first message is a first broadcasting message carrying a transmission power increment message of a base station in the vicinity. The second message is a second broadcasting message carrying a transmission power decrement message of the camped base station. When an idle UE receives the second message to discover that the camped base station is going to decrease its transmission power, and the strength of the received system broadcasting signal is lower than a predefined threshold, the idle UE may choose to reconnect the base station (for instance, through a request for connecting service to regain the connection; or to transmit a specific signal and to have the camped base station measuring the signal) and let the camped base station measures its uplink signal strength or quality; or the idle UE will feed back the connection quality and the signal strength information. Corresponding to a predefined condition, the idle UE selectively feeds back a second measurement report, as described in the previous paragraphs and will not be repeated.

On the other hand, if an idle UE has the ability to receive the system information broadcasting of the vicinity base station, then when the idle UE receives the first message and discovers that the camped base station notifies a base station in the vicinity of being going to increase the transmission power, also, the transmission signal strength of the vicinity base station measured by the idle UE is higher than a predefined threshold, the idle UE may choose to reconnect the base station (for instance, through a request for connecting service to regain connection, or to transmit a specific signal and to have the camped base station measures the signal) and let the camped base station measures its uplink signal strength or quality, or the idle UE will feed back the connection quality and the interference strength information. Corresponding to a predefined condition the idle UE may choose to feed back a second measurement report, as described in the previous paragraphs and will not be repeated.

In summary, the disclosed exemplary embodiments of the method of managing transmission of notification message and the electronic device and the electronic system using the same may trigger a notification procedure to the designated base station(s) before adjusting the transmission power of a base station. The idle user equipment (UE) may proceed the indicated measurement according to the received notification message, and may selectively choose to feed back a measurement report as a reference for adjusting the transmission power of a base station.

It is intended that the specification and examples be considered as exemplary only, with a true scope of the application being indicated by the following claims and their equivalents.

What is claimed is:

1. A method for managing transmission of notification messages, comprising:
   recognizing a transmission power of a base station is to be increased or decreased based on a base station information;
   triggering a first notification procedure to have one or more vicinity base stations of the base station transmitting a first message, if the transmission power of the base station is to be increased; and
   triggering a second notification procedure to have the base station transmitting a second message, if the transmission power of the base station is to be decreased.

2. The method of claim 1, further comprising:
   notifying one or more idle user equipments (UEs) camping on the one or more vicinity base stations to measure a signal interference caused by the base station, through the first message.

3. The method of claim 2, wherein the first message notifying the one or more idle UEs feed back a first measurement report when a measured signal interference meets a signal interference condition, for a self-organizing network controller to determine an adjustment of the transmission power of the base station according to the first measurement report.

4. The method of claim 1, further comprising:
   notifying one or more idle user equipments (UEs) camping on the base station to measure a signal strength of the base station, through the second message.

5. The method of claim 4, wherein the second message notifying the one or more idle UEs feed back a second measurement report when a measured signal strength meets a signal strength condition, for a self-organizing network controller to determine an adjustment of the transmission power of the base station according to the second measurement report.

6. The method of claim 1, wherein the first message and the second message are a first paging message and a second paging message, respectively, and each of the first paging message and the second paging message has a predetermined paging cause.

7. The method of claim 1, wherein the first message is a first broadcasting message carrying a transmission power increment message of a base station in the vicinity and the second message is a second broadcasting message carrying a transmission power decrement message of the base station.

8. The method of claim 1, further comprising:
   receiving the base station information from a self-organizing network controller, wherein the base station information comprises n base station identities (IDs) with corresponding transmission power adjustment settings, respectively;
   finding one or more vicinity base station IDs of a i-th base station ID within the n base station IDs and adding the one or more vicinity base station IDs into a transmission list, when the i-th base station corresponds to a transmission power increment setting, wherein one or more base stations corresponding to the one or more vicinity base station IDs is one or more base stations in the vicinity corresponding to the i-th base station ID;
   adding the i-th base station ID into the transmission list, when the i-th base station corresponds to a transmission power decrement setting, wherein n is a positive integer, and i is a positive integer between 1 and n; and
   having a mobility management controller transmitting at least one notification message according to at least one base station ID recorded in the transmission list.

9. An electronic device for managing transmission of notification messages, comprising:
   a transceiver, receiving a base station information; and
   a processing circuit, is operatively coupled to the transceiver, being configured to:
   recognize a transmission power of a base station is to be increased or decreased according to the base station information;
   trigger a first notification procedure to have one or more vicinity base stations of the base station transmitting a first message, if the transmission power of the base station is to be increased; and
   trigger a second notification procedure to have the base station transmitting a second message, if the transmission power of the base station is to be decreased.

10. The electronic device of claim 9, wherein the first message notifying one or more idle user equipments (UEs) camping on the one or more base stations to measure a signal interference caused by the base station, through the first message.

11. The electronic device of claim 10, wherein the first message notifying the one or more idle UEs feed back a first measurement report when a measured signal interference meets a signal interference condition, for a self-organizing network controller to determine an adjustment of the transmission power of the base station according to the first measurement report.

12. The electronic device of claim 9, wherein the second message notifying one or more idle user equipments (UEs) camping on the base station to measure a signal strength of the base station.

13. The electronic device of claim 12, wherein the second message notifying the one or more idle UEs feed back a second measurement report when a measured signal strength meets a signal strength condition, for a self-organizing network controller to determine an adjustment of the transmission power of the base station according to the second measurement report.

14. The electronic device of claim 9, wherein the first message and the second message are a first paging message and a second paging message, respectively, and each of the first paging message and the second paging message has a predetermined paging cause.

15. The electronic device of claim 9, wherein the first message is a first broadcasting message carrying a transmission power increment message of a base station in the vicinity and the second message is a second broadcasting message carrying a transmission power decrement message of the base station.

16. The electronic device of claim 9, wherein the transceiver receives the base station information from a self-organizing network controller, the base station information comprises n base station identities (IDs) with corresponding transmission power adjustment settings, respectively, and the processing circuit is further configured to:

find one or more vicinity base station IDs of a i-th base station ID within the n base station IDs and add the one or more vicinity base station IDs into a transmission list, when the i-th base station corresponds to a transmission power increment setting, wherein one or more base station corresponding to the one or more vicinity base station IDs is one or more base stations in the vicinity corresponding to the i-th base station ID;

add the i-th base station ID into the transmission list, when the i-th base station corresponds to a transmission power decrement setting, wherein n is a positive integer, and i is a positive integer between 1 and n; and have a mobility management controller transmitting at least one notification message according to at least one base station ID recorded in the transmission list.

17. An electronic system for managing transmission of notification messages, comprising:

a self-organizing network controller, providing a base station information; and a base station selector, coupled to the self-organizing network, determining a base station is to be increased or decreased a transmission power according to the base station information, wherein the base station selector triggers a mobility management controller to perform a first notification procedure to have one or more vicinity base stations of the base station transmitting a first message, if the transmission power of the base station is to be increased; and the base station selector triggers the mobility management controller to perform a second notification procedure to have the base station transmitting a second message, if the transmission power of the base station is to be decreased.

18. The electronic system of claim 17, wherein the first message notifying one or more idle user equipments (UEs) camping on the one or more vicinity base stations to measure a signal interference caused by the base station, through the first message.

19. The electronic system of claim 18, wherein the first message notifying the one or more idle UEs feed back a first measurement report when a measured signal interference meets a signal interference condition, for a self-organizing network controller to determine an adjustment of the transmission power of the base station according to the first measurement report.

20. The electronic system of claim 17, wherein the second message notifying one or more idle user equipments (UEs) camping on the base station to measure a signal strength of the base station.

21. The electronic system of claim 20, wherein the second message notifying the one or more idle UEs feed back a second measurement report when a measured signal strength meets a signal strength condition, for the self-organizing network controller to determine an adjustment of the transmission power of the base station according to the second measurement report.

22. The electronic system of claim 17, wherein the first message and the second message are a first paging message and a second paging message, respectively, and each of the first paging message and the second paging message has a predetermined paging cause.

23. The electronic system of claim 17, wherein the first message is a first broadcasting message carrying a transmission power increment message of a base station in the vicinity and the second message is a second broadcasting message carrying a transmission power decrement message of the base station.

24. The electronic system of claim 17, wherein the base station information comprises n base station identities (IDs) with corresponding transmission power adjustment settings, respectively, wherein the base station selector finds one or more vicinity base station IDs of a i-th base station ID within the n base station IDs and add the one or more vicinity base station IDs into a transmission list, when the i-th base station corresponds to a transmission power increment setting, wherein one or more base station corresponding to the one or more vicinity base station IDs is one or more base stations in the vicinity corresponding to the i-th base station ID;

the base station selector adds the i-th base station ID into the transmission list, when the i-th base station corresponds to a transmission power decrement setting, wherein n is a positive integer, and i is a positive integer between 1 and n; and the base station selector has the mobility management controller transmitting at least one notification message according to at least one base station ID recorded in the transmission list.

* * * * *